(12) United States Patent
Fukuroda et al.

(10) Patent No.: US 10,619,040 B2
(45) Date of Patent: Apr. 14, 2020

(54) PROPYLENE RESIN COMPOSITION AND INJECTION MOLDED ARTICLE

(71) Applicant: Sumitomo Chemical Company, Limited, Tokyo (JP)

(72) Inventors: Hiroshi Fukuroda, Ichihara (JP); Toshiya Maruyama, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 17 days.

(21) Appl. No.: 15/949,158

(22) Filed: Apr. 10, 2018

(65) Prior Publication Data

US 2018/0298177 A1   Oct. 18, 2018

(30) Foreign Application Priority Data

Apr. 14, 2017 (JP) .................. 2017-080588

(51) Int. Cl.
C08L 23/10 (2006.01)
C08L 23/12 (2006.01)
C08L 23/08 (2006.01)

(52) U.S. Cl.
CPC ........... *C08L 23/12* (2013.01); *C08L 23/0815* (2013.01); *C08L 23/10* (2013.01); *C08L 2205/025* (2013.01); *C08L 2205/035* (2013.01); *C08L 2207/02* (2013.01)

(58) Field of Classification Search
CPC .............................. C08L 23/10; C08L 23/0815
See application file for complete search history.

(56) References Cited

U.S. PATENT DOCUMENTS

| | | |
|---|---|---|
| 5,332,789 A | 7/1994 | Tanaka et al. |
| 5,777,056 A | 7/1998 | Tsuruoka et al. |
| 2010/0137498 A1 | 6/2010 | Kobayashi et al. |
| 2015/0018474 A1 | 1/2015 | Nakajima |
| 2017/0081509 A1 | 3/2017 | Itakura et al. |

FOREIGN PATENT DOCUMENTS

| | | |
|---|---|---|
| DE | 102004061859 A1 | 7/2005 |
| EP | 2495264 A1 | 9/2012 |
| JP | H05005010 A | 1/1993 |
| JP | H06240069 A | 8/1994 |
| JP | 2004051837 A | 2/2004 |
| JP | 2009062526 A | 3/2009 |
| JP | 2011132294 A | 7/2011 |

OTHER PUBLICATIONS

Extended European Search Report dated Aug. 21, 2018 in EP Application No. 18167079.5.

*Primary Examiner* — Vickey Nerangis
(74) *Attorney, Agent, or Firm* — Panitch Schwarze Belisario & Nadel LLP

(57) ABSTRACT

The present invention relates to a propylene resin composition comprising a propylene-based polymer (component A), an ethylene-α-olefin copolymer (component B) and a filler (component C), wherein parameters W, X and Y satisfy $1.46 \leq ((Y/X)/W) \times 100$, wherein W and X represent a total content (% by mass) of a xylene-insoluble component and a total content (% by mass) of a xylene-soluble component in the component A and the component B, respectively, based on a total mass of the component A and the component B, and Y represents an amount (% by mass) of a long-duration relaxation component, in the molded article obtained by injection molding a propylene resin composition into a mold cavity of 100 mm (width)×400 mm (length)×3 mm (thickness) under the conditions of a cylinder temperature of 220° C., a mold temperature of 50° C. and an injection speed of 23 mm/sec.

9 Claims, 1 Drawing Sheet

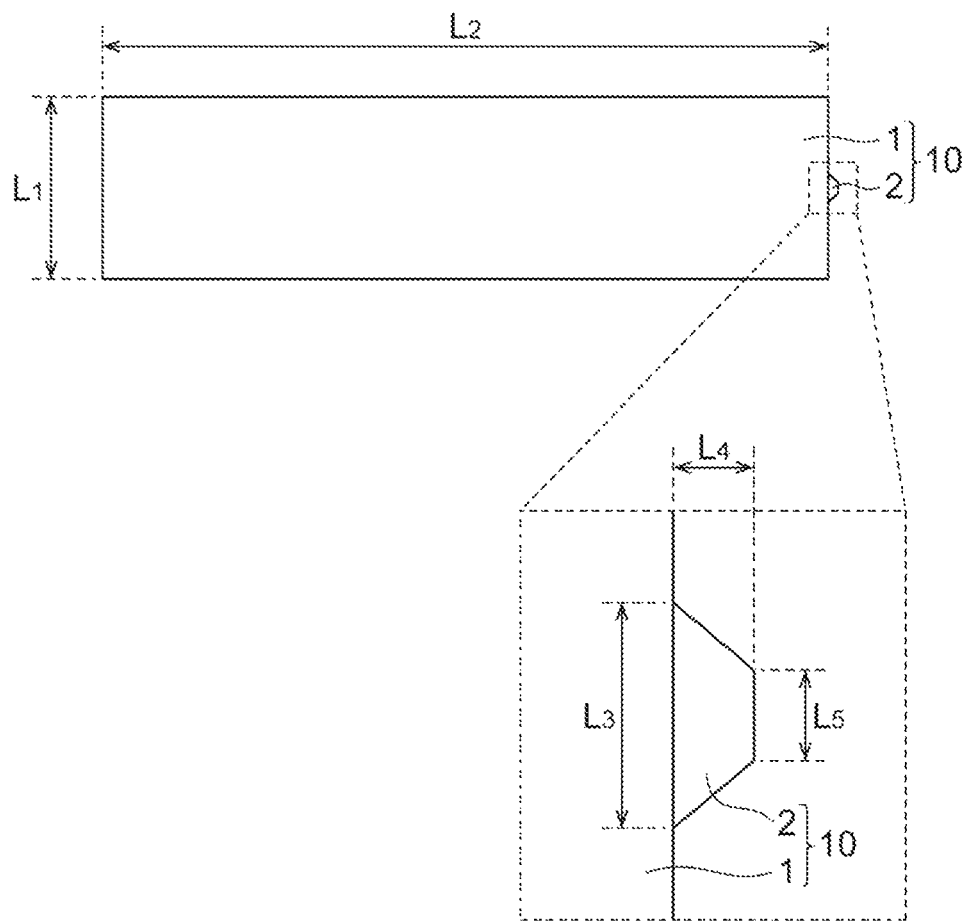

PROPYLENE RESIN COMPOSITION AND INJECTION MOLDED ARTICLE

TECHNICAL FIELD

The present invention relates to a propylene resin composition and a molded article.

BACKGROUND

Molded articles formed from a propylene resin composition are used for automotive materials, household electrical appliances and the like. For instance, a molded article formed of a resin composition that contains a propylene-based block copolymer, an elastomer and a filler is disclosed in Patent Document 1.

CITATION LIST

Patent Literature

[Patent Literature 1] Japanese Unexamined Patent Publication No. 2011-132294

SUMMARY

In recent years, high dimensional stability is required of molded articles which are used for automotive materials, household electrical appliances and the like.

Then, an object of the present invention is to provide a propylene resin composition from which a molded article excellent in dimensional stability can be produced. Another object of the present invention is to provide a molded article excellent in the dimensional stability.

The present invention relates to a propylene resin composition comprising a propylene-based polymer (A), an ethylene-α-olefin copolymer (B), the ethylene-α-olefin copolymer (B) not containing a monomer unit derived from propylene, and a filler (C), wherein parameters W, X and Y to be defined below satisfy the following expression (1).

$$1.46 \leq ((Y/X)/W) \times 100 \tag{1}$$

In the expression,

W represents a total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents a total content (% by mass) of a xylene-soluble component in the propylene-based polymer (A) and the ethylene-α-olefin copolymer (B), based on the total mass of the propylene-based polymer (A) and the ethylene-α-olefin copolymer (B), and Y represents an amount (% by mass) of a long-duration relaxation component measured by pulse NMR, in a molded article obtained by injection molding a propylene resin composition into a mold cavity of 100 mm (width)× 400 mm (length)×3 mm (thickness) under conditions of a cylinder temperature of 220° C., a mold temperature of 50° C. and an injection speed of 23 mm/sec.

In the propylene resin composition of the present invention, a content of the propylene-based polymer (A) may be 20 to 70% by mass, a content of the ethylene-α-olefin copolymer (B) may be 10 to 40% by mass, and a content of the filler (C) may be 10 to 40% by mass.

The present invention also relates to an injection molded article formed of the above propylene resin composition.

The present invention also relates to a molded article comprising a propylene-based polymer (A), an ethylene-α-olefin copolymer (B), the ethylene-α-olefin copolymer (B) not containing a monomer unit derived from propylene, and a filler (C), wherein parameters W, X and Y to be defined below satisfy the following expression (1).

$$1.46 \leq ((Y/X)/W) \times 100 \tag{1}$$

In the expression,

W represents a total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents a total content (% by mass) of a xylene-soluble component in the propylene-based polymer (A) and the ethylene-α-olefin copolymer (B), based on the total mass of the propylene-based polymer (A) and the ethylene-α-olefin copolymer (B), and Y represents an amount (% by mass) of a long-duration relaxation component measured by pulse NMR, in the molded article.

According to the present invention, the propylene resin composition can be provided from which a molded article excellent in the dimensional stability can be produced. According to the present invention, the molded article can be provided that is excellent in dimensional stability.

BRIEF DESCRIPTION OF THE DRAWINGS

FIG. 1 is a schematic view of an injection molded article for evaluation.

DETAILED DESCRIPTION

[Definition]

In the present specification, the term "α-olefin" means an unsaturated aliphatic hydrocarbon having a carbon-carbon unsaturated double bond at the α-position.

In the present specification, the term "xylene-insoluble component (also referred to as "component CXIS")" means a solid body that is a component insoluble in p-xylene, which is contained in the material, and is obtained according to the following method.

The solid body precipitates in a cooled solution obtained by cooling the solution to 20° C., which has been obtained by dissolving about 2 g of the material in boiling p-xylene for 2 hours.

In the present specification, the term "xylene-soluble component (hereinafter referred to also as "component CXS") means a component other than the "component CXIS" in the material.

In the present specification, the term "ethylene-α-olefin copolymer" means a copolymer that contains a monomer unit derived from ethylene and a monomer unit derived from an α-olefin having 4 or more carbon atoms, and does not contain a monomer unit derived from propylene.

In the present specification, the term "heterophasic propylene polymer material" means a mixture having a structure in which a polymer (II) containing a monomer unit derived from at least one an α-olefin selected from the group consisting of ethylene and α-olefins having 4 or more and 12 or less carbon atoms and monomer units derived from propylene disperse in a matrix of a polymer (I) containing 80% by mass or more of a monomer unit derived from propylene (provided that total mass of polymer (I) is 100% by mass).

In the present specification, the term "propylene resin composition" means a composition containing the propylene-based polymer.

Hereafter, some embodiments of the present invention will be described in detail. However, the present invention is not limited to the following embodiments. In the present specification, the description of "lower limit to upper limit" which represents a numerical range represents "the lower limit or more and the upper limit or less", and the description of the "upper limit to the lower limit" represents "the upper limit or less and the lower limit or more". In other words, these descriptions represent numerical ranges containing the upper limit and the lower limit.

[Propylene Resin Composition]

The propylene resin composition according to the present embodiment (hereinafter simply referred to also as resin composition) is a propylene resin composition comprising a propylene-based polymer (A), an ethylene-α-olefin copolymer (B) and a filler (C), wherein parameters W, X, and Y to be defined below satisfy the following expression (1).

$$1.46 \leq ((Y/X)/W) \times 100 \quad (1)$$

In the expression,

W represents a total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents a total content (% by mass) of a xylene-soluble component in the propylene-based polymer (A) and the ethylene-α-olefin copolymer (B), based on the total mass of the propylene-based polymer (A) and the ethylene-α-olefin copolymer (B), and Y represents an amount (% by mass) of a long-duration relaxation component measured by pulse NMR, in the molded article that has been obtained by injection molding a propylene resin composition into a mold cavity of 100 mm (width)×400 mm (length)×3 mm (thickness) under the conditions of a cylinder temperature of 220° C., a mold temperature of 50° C. and an injection speed of 23 mm/sec.

A molded article excellent in the dimensional stability can be produced from such a propylene resin composition. It is considered that by an operation of molding the propylene resin composition of the present embodiment, it becomes possible to decrease coefficients of linear expansion in both of the direction of resin flow (hereinafter also referred to as "MD direction") of the molded article and the width direction (hereinafter referred to also as "TD direction") which is perpendicular to the MD direction. Incidentally, the numerical value calculated by the expression of "((Y/X)/W)×100" may be, for instance, 2.00 or less.

Here, in the case where a relaxation curve of the molded article, which has been obtained by pulse NMR, has been separated into three components, the content Y of the long-duration relaxation component represents an amount (% by mass) of a component derived from the separation curve having the longest relaxation time period.

In the present specification, the content Y of the long-duration relaxation component in the molded article is a value calculated in the following way with the use of the pulse NMR (minispecmq 20) made by Bruker Co., Ltd. A test piece of the molded article is set in a sample pipe (with outer diameter of 10 mm) made from glass, and measurement is performed with the use of a solid echo method under conditions of a measurement temperature of 23° C., a number of integration times of 64 times, and a 90° pulse width of 4.10 μs. The relaxation curve obtained by the above described measurement is separated into three components having different relaxation time periods from each other, the component having the longest relaxation time period is determined to be the long-duration relaxation component, and the amount (% by mass) of the long-duration relaxation component with respect to the total mass of the molded article is calculated.

The above described content W may be, for instance, 50 to 90% by mass, 55 to 85% by mass, or 60 to 80% by mass. The above described content X may be, for instance, 10 to 50% by mass, 15 to 45% by mass, or 20 to 40% by mass. The above described content Y may be, for instance, 10 to 60% by mass, 15 to 55% by mass, or 15 to 50% by mass.

Hereinafter, each component represented by the above described "propylene-based polymer (A)" or the like is referred to simply as "component A" or the like.

Each component will be described below.

[Propylene-based Polymer (A)]

A component A is a polymer having a monomer unit derived from propylene. Examples of the component A include: a propylene homopolymer; a random copolymer of propylene and a monomer other than propylene; and a heterophasic propylene polymer material. The propylene resin composition of the present embodiment may contain only one component A, or may contain two or more components. It is preferable for the component A to contain at least one kind selected from the group consisting of the propylene homopolymer and the heterophasic propylene polymer material, from the viewpoints of rigidity and impact resistance of the molded article.

(Propylene Homopolymer)

In the case where the component A contains the propylene homopolymer, it is preferable for the intrinsic-viscosity number ([η]) of the propylene homopolymer to be 0.10 to 2.00 dL/g, and is more preferable to be 0.50 to 1.50 dL/g, and is further preferable to be 0.70 to 1.40 dL/g, from the points of fluidity at the time when the resin composition has melted and a toughness of the molded article.

In the present specification, the intrinsic-viscosity number (unit: dL/g) is a value which is measured at a temperature of 135° C. by using tetralin as a solvent, by the following method.

Reduced viscosity is measured at three points of concentrations of 0.1 g/dL, 0.2 g/dL, and 0.5 g/dL, by using an Ubbelohde viscometer. The intrinsic-viscosity number is determined by an extrapolation method of plotting the reduced viscosity against the concentration and extrapolating the concentration to zero. A method for calculating the intrinsic-viscosity number by the extrapolation method is described, for instance, in "Polymer Solutions, Polymer Experimentology 11" (published by Kyoritsu Shuppan Co., Ltd. 1982), page 491.

It is preferable for the molecular weight distribution (Mw/Mn) of the above described propylene homopolymer to be 3.0 or more, and is more preferable to be 6.0 or more. The molecular weight distribution of the component A may be 30.0 or less, and may also be 25.0 or less.

In the present specification, the molecular weight distribution refers to a ratio (Mw/Mn) of a weight average molecular weight (Mw) to a number average molecular weight (Mn), which is calculated with the use of the weight average molecular weight (Mw) and the number average molecular weight (Mn) that are measured by a gel permeation chromatography (GPC) under the following conditions.

Apparatus: HLC-8121 GPC/HT made by Tosoh Corporation

Separation column: 3 columns of GMHHR-H(S)HT made by Tosoh Corporation

Measurement temperature: 140° C.

Carrier: Orthodichlorobenzene

Flow rate: 1.0 mL/min

Sample concentration: about 1 mg/mL

Amount of injected sample: 400 µL

Detector: differential refractometry

Calibration curve preparation method: standard polystyrene was used.

The propylene homopolymer can be produced, for instance, by the polymerization of propylene with the use of a polymerization catalyst.

Examples of the polymerization catalyst include: a Ziegler type catalyst; a Ziegler-Natta type catalyst; a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, chemical compound which forms an ionic complex, an organoaluminum compound and the like) is carried on an inorganic particle (silica, clay minerals or the like), and is denatured.

Such catalysts may be used as the above described polymerization catalysts as to be described in Japanese Unexamined Patent Publication No. S61-218606, Japanese Unexamined Patent Publication No. H5-194685, Japanese Unexamined Patent Publication No. H7-216017, Japanese Unexamined Patent Publication No. H9-316147, Japanese Unexamined Patent Publication No. H10-212319, and Japanese Unexamined Patent Publication No. 2004-182981.

A polymer obtained by prepolymerizing propylene in the presence of the above described polymerization catalyst can also be used as the polymerization catalyst.

Examples of the polymerization methods include bulk polymerization, solution polymerization, and gas phase polymerization. Here, the bulk polymerization refers to a method in which the polymerization is carried out by using a liquid olefin as a medium at a polymerization temperature, and the solution polymerization is a method in which the polymerization is carried out in an inert hydrocarbon solvent such as propane, butane, isobutane, pentane, hexane, heptane and octane. In addition, the gas phase polymerization refers to a method of using a gaseous monomer as a medium, and polymerizing the gaseous monomers in the medium.

Examples of the manner of polymerization include batch system, a continuous system and combinations thereof. The manner of polymerization may be a multistage system in which a plurality of polymerization reaction vessels are connected in series.

From the viewpoint of industrial and economic superiority, a continuous type of gas phase polymerization method or a bulk-gas phase polymerization method in which a bulk polymerization method and a gas phase polymerization method are carried out continuously is preferable.

Various conditions (polymerization temperature, polymerization pressure, monomer concentration, amount of catalyst to be charged, polymerization time period and the like) in the polymerization step may be appropriately determined according to a molecular structure of an aimed polymer.

It is acceptable to dry the polymer at a temperature or lower at which the polymer melts, as needed after the polymerization step, so as to remove a remaining solvent contained in the polymer, oligomers of very low molecular weight, which are produced as by-products at the time of production, and the like. Examples of drying methods include the methods described in Japanese Unexamined Patent Publication No. S55-75410, Japanese Patent No. 2565753 and the like.

(Random Copolymer of Propylene and Monomer other than Propylene)

A random copolymer of propylene and a monomer other than propylene contains a monomer unit that is derived from propylene and a monomer unit that is derived from a monomer other than propylene. It is preferable for the above described random copolymer to contain 0.01% by mass or more and 20% by mass or less of the monomer unit that is derived from the monomer other than the propylene, based on the mass of the above described random copolymer.

Examples of monomers other than propylene include ethylene and α-olefins having 4 or more and 12 or less carbon atoms. Among the monomers, at least one monomer selected from the group consisting of ethylene and α-olefins having 4 to 10 carbon atoms is preferable, and at least one monomer selected from the group consisting of ethylene, 1-butene, 1-hexene and 1-octene is more preferable, and at least one monomer selected from the group consisting of ethylene and 1-butene is further preferable.

Examples of the above described random copolymers include propylene-ethylene random copolymers, propylene-1-butene random copolymers, propylene-1-hexene random copolymers, propylene-1-octene random copolymers, propylene-ethylene-1-butene random copolymers, propylene-ethylene-1-hexene random copolymers, and propylene-ethylene-1-octene random copolymers.

When the component A contains a random copolymer of the propylene and the monomer other than propylene, it is preferable for the intrinsic-viscosity number ([η]) of the above described random copolymer to be 0.10 to 2.00 dL/g, is more preferable to be 0.50 to 1.50 dL/g, and is further preferable to be 0.70 to 1.40 dL/g, from the viewpoint of the fluidity at the time when the resin composition has been melted.

It is preferable for the molecular weight distribution (Mw/Mn) of the above described random polymer to be 3.0 or more, and is more preferable to be 6.0 or more. The molecular weight distribution of the above described random polymer may be 30.0 or less, and may also be 25.0 or less. The molecular weight distribution of the random polymer may be 3.0 to 30.0, and may also be 6.0 to 25.0.

The above described random copolymer can be produced, for instance, by the polymerization of the propylene and the monomer other than the propylene, according to a polymerization catalyst, a polymerization method and a manner of polymerization that can be all used in the production of the above described propylene homopolymer.

(Heterophasic Propylene Polymer Material)

The heterophasic propylene polymer material can be produced, for instance, by an operation of carrying out a first polymerization step of forming a polymer (I) and a second polymerization step of forming a polymer (II). Illustrations of the polymerization catalyst, the polymerization method and the manner of polymerization which are adopted in these polymerization steps are similar to those in the above description.

The polymer (I) may be, for instance, a propylene homopolymer, or may contain a monomer unit derived from a monomer other than the propylene. In the case where the polymer (I) contains the monomer unit derived from the monomer other than the propylene, the content may be, for instance, 0.01% by mass or more and less than 20% by mass, based on the total mass of the polymer (I).

Examples of the monomers other than the propylene include ethylene and α-olefins having 4 or more carbon atoms. Among the monomers, at least one selected from the group consisting of the ethylene and the α-olefins having 4 to 10 carbon atoms is preferable, at least one selected from the group consisting of the ethylene, the 1-butene, the 1-hexene and the 1-octene is more preferable, and at least one selected from the group consisting of the ethylene and the 1-butene is further preferable.

Examples of the polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer and a propylene-ethylene-1-octene copolymer.

It is preferable for the polymer (I) to be a propylene homopolymer, a propylene-ethylene copolymer, a propylene-1-butene copolymer, a propylene-ethylene-1-butene copolymer, and is more preferable to be the propylene homopolymer, from the viewpoint of the rigidity of the molded article.

It is preferable for the content of the polymer (I) to be 50 to 99% by mass, and is more preferable to be 60 to 90% by mass, based on the total mass of the heterophasic propylene polymer material.

It is preferable that the polymer (II) contains 40% by mass or more of a monomer unit derived from at least one α-olefin selected from the group consisting of the ethylene and α-olefins having 4 or more and 12 or less carbon atoms, and contains the monomer unit derived from the propylene.

In the polymer (II), a content of a monomer unit derived from at least one α-olefin selected from the group consisting of ethylene and the α-olefins having 4 or more and 12 or less carbon atoms may be, for instance, 70% by mass or more, and may also be 60% by mass or less, from the viewpoint of the compatibility with another component and the viewpoint of an impact resistance of the molded article.

From the above viewpoints, in the polymer (II), a content of the monomer unit derived from at least one α-olefin selected from the group consisting of the ethylene and the α-olefins having 4 or more and 12 or less carbon atoms may be, for instance, 40 to 70% by mass, and may also be 45 to 60% by mass.

In the polymer (II), as for the at least one α-olefin selected from the group consisting of ethylene and α-olefins having 4 to 12 carbon atoms, at least one type selected from the group consisting of ethylene and α-olefins having 4 to 10 carbon atoms is preferable; at least one type selected from the group consisting of ethylene, 1-butene, 1-hexene, 1-octene and 1-decene is more preferable; and at least one type selected from the group consisting of ethylene and 1-butene is further preferable.

Examples of the polymer (II) include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer and a propylene-1-decene copolymer. Among the polymers, it is preferable to be a propylene-ethylene copolymer, a propylene-1-butene copolymer and a propylene-ethylene-1-butene copolymer, and is more preferable to be a propylene-ethylene copolymer.

It is preferable for the content of the polymer (II) to be 1 to 50% by mass, and is more preferable to be 10 to 40% by mass, based on the total mass of the heterophasic propylene polymer material.

It is preferable for the content of the component CXIS in the heterophasic propylene polymer material to be 50 to 99% by mass, and is more preferable to be 60 to 90% by mass, based on the total mass of the heterophasic propylene polymer material.

It is preferable for the content of the component CXS in the heterophasic propylene polymer material to be 1 to 50% by mass, and is more preferable to be 10 to 40% by mass, based on the total mass of the heterophasic propylene polymer material.

In the present embodiment, it is considered that the xylene-insoluble (CXIS) component in the heterophasic propylene polymer material is mainly composed of the polymer (I), and the xylene-soluble (CXS) component in the heterophasic propylene polymer material is mainly composed of the polymer (II).

Examples of the heterophasic propylene polymer material include a (propylene)-(propylene-ethylene) polymer material, a (propylene)-(propylene-ethylene-1-butene) polymer material, a (propylene)-(propylene-ethylene-1-hexene) polymer material, a (propylene)-(propylene-ethylene-1-octene) polymer material, a (propylene)-(propylene-1-butene) polymer material, a (propylene)-(propylene-1-hexene) polymer material, a (propylene)-(propylene-1-octene) polymer material, a (propylene)-(propylene-1-decene) polymer material, a (propylene-ethylene)-(propylene-ethylene) polymer material, a (propylene-ethylene)-(propylene-ethylene-1-butene) polymer material, a (propylene-ethylene)-(propylene-ethylene-1-hexene) polymer material, a (propylene-ethylene)-(propylene-ethylene-1-octene) polymer material, a (propylene-ethylene)-(propylene-ethylene-1-decene) polymer material, a (propylene-ethylene)-(propylene-1-butene) polymer material, a (propylene-ethylene)-(propylene-1-hexene) polymer material, a (propylene-ethylene)-(propylene-1-octene) polymer material, a (propylene-ethylene)-(propylene-1-decene) polymer material, a (propylene-1-butene)-(propylene-ethylene) polymer material, a (propylene-1-butene)-(propylene-ethylene-1-butene) polymer material, a (propylene-1-butene)-(propylene-ethylene-1-hexene) polymer material, a (propylene-1-butene)-(propylene-ethylene-1-octene) polymer material, a (propylene-1-butene)-(propylene-ethylene-1-decene) polymer material, a (propylene-1-butene)-(propylene-1-butene) polymer material, a (propylene-1-butene)-(propylene-1-hexene) polymer material, a (propylene-1-butene)-(propylene-1-octene) polymer material, a (propylene-1-butene)-(propylene-1-decene) polymer material, a (propylene-1-hexene)-(propylene-1-hexene) polymer material, a (propylene-1-hexene)-(propylene-1-octene) polymer material, a (propylene-1-hexene)-(propylene-1-decene) polymer material, a (propylene-1-octene)-(propylene-1-octene) polymer material, and a (propylene-1-octene)-(propylene-1-decene) polymer material.

Here, the description of "(propylene)-(propylene-ethylene) polymer material" means that "the polymer (I) is a propylene homopolymer, and the polymer (II) is a heterophasic propylene polymer material which is a propylene-ethylene copolymer". The description is similar in other similar expressions.

It is preferable for the heterophasic propylene polymer material to be the (propylene)-(propylene-ethylene) polymer material, the (propylene)-(propylene-ethylene-1-butene) polymer material, the (propylene-ethylene)-(propylene-ethylene) polymer material, the (propylene-ethylene)-(propylene-ethylene-1-butene) polymer material or the (propylene-1-butene)-(propylene-1-butene) polymer material, and is more preferable to be the (propylene)-(propylene-ethylene) polymer material.

It is preferable for the intrinsic-viscosity number ([η]I) of the polymer (I) to be 0.10 to 2.00 dL/g, is more preferable to be 0.50 to 1.50 dL/g, and is more preferable to be 0.70 to 1.40 dL/g.

It is preferable for the intrinsic-viscosity number ([η]II) of the polymer (II) to be 1.00 to 10.00 dL/g, is more preferable to be 2.00 to 10.00 dL/g, and is further preferable to be 2.00 to 8.00 dL/g.

It is preferable for a ratio ([η]II/[η]I) of the intrinsic-viscosity number (η)II of the polymer (II) to the intrinsic-viscosity number ([η]I) of the polymer (I) to be 1 to 20, is more preferable to be 1 to 10, and is further preferable to be 1 to 9.

Examples of methods of measuring the intrinsic-viscosity number ([η]I) of the polymer (I) include a method of forming the polymer (I) and then measuring the intrinsic-viscosity number of the polymer.

The intrinsic-viscosity number ([η]II) of the polymer (II) can be calculated, for instance, with the use of the intrinsic-viscosity number ([η] Total) of the heterophasic propylene polymer material, the intrinsic-viscosity number ([η]I) of the polymer (I), and the contents of the polymer (II) and the polymer (I), according to the following expression (6).

$$[\eta]II = ([\eta]Total - [\eta]I \times XI)/XII \quad (6)$$

[η]Total: intrinsic-viscosity number of heterophasic propylene polymer material (dL/g)

[η]I: intrinsic-viscosity number (dL/g) of polymer (1)

XI: ratio of mass of polymer (I) to total mass of heterophasic propylene polymer material (mass of polymer (I)/mass of heterophasic propylene polymer material)

XII: ratio of mass of polymer (II) to total mass of heterophasic propylene polymer material (mass of polymer (II)/mass of heterophasic propylene polymer material)

Here, XI and XII can be determined from a substance balance at the time of the polymerization.

Incidentally, XII may be calculated with the use of the following expression after the quantity of melting heat of the polymer (I) and the quantity of melting heat of the heterophasic propylene polymer material have been measured.

$$XII = 1 - (\Delta Hf)T/(\Delta Hf)P$$

(ΔHf)T: quantity of melting heat (J/g) of heterophasic propylene polymer material (ΔHf) P: quantity of melting heat (J/g) of polymer (I)

It is preferable for the intrinsic-viscosity number ([η] CXIS) of the component CXIS of the heterophasic propylene polymer material to be 0.10 to 2.00 dL/g, is more preferable to be 0.50 to 1.50 dL/g, and is more preferable to be 0.70 to 1.40 dL/g.

It is preferable for the intrinsic-viscosity number ([η] CXS) of the component CXS of the heterophasic propylene polymer material to be 1.00 to 10.00 dL/g, is more preferable to be 2.00 to 10.00 dL/g, and is further preferable to be 2.00 to 8.00 dL/g.

It is preferable for a ratio ([η]CXS/[η]CXIS) of the intrinsic-viscosity number ([η]CXS) of the component CXS of the heterophasic propylene polymer material to the intrinsic-viscosity number ([η]CXIS) of the component CXIS of the heterophasic propylene polymer material to be 1 to 20, is more preferable to be 1 to 10, and is further preferable to be 1 to 9.

It is preferable for a molecular weight distribution (Mw (I)/Mn(I)) of the polymer (I) to be 3.0 or more, and is more preferable to be 6.0 or more. The molecular weight distribution of the polymer (I) may be 30.0 or less, or may be 25.0 or less. The molecular weight distribution of the polymer (I) may be 3.0 to 30.0, or may be 6.0 to 25.0.

It is preferable for a molecular weight distribution (Mw (CXIS)/Mn(CXIS)) of the component CXIS of the heterophasic propylene polymer material to be 3.0 or more, and is more preferable to be 6.0 or more. The molecular weight distribution of the component CXIS of the heterophasic propylene polymer material may be 30.0 or less, or may be 25.0 or less. The molecular weight distribution of the component CXIS of the heterophasic propylene polymer material may be 3.0 to 30.0, or may be 6.0 to 25.0.

It is preferable for an isotactic pentad fraction (also referred to as "mmmm" fraction) of the component A to be 0.950 or more, and is more preferable to be 0.970 or more, from the viewpoint of the rigidity and dimensional stability of the molded article formed from the resin composition. The isotactic pentad fraction of the component A may be, for instance, 1.000 or less.

The isotactic pentad fraction means an isotactic fraction in a pentad unit. In other words, the isotactic pentad fraction indicates a content of a structure in which five monomer units that are derived from propylene are continuously meso-bonded in terms of pentad units. Incidentally, when the component of interest is a copolymer, the isotactic pentad fraction means a value that is measured for the chain of monomer units which are derived from propylene.

In the present specification, the isotactic pentad fraction refers to a value that is measured by the $^{13}$C-NMR spectrum. Specifically, a ratio of an area of an mmmm peak with respect to an area of the total absorption peak in a methyl carbon region which is obtained by the $^{13}$C-NMR spectrum is defined as the isotactic pentad fraction. Incidentally, a method for measuring the isotactic pentad fraction by the $^{13}$C-NMR spectrum is described, for instance, in Macromolecules, 6, 925 (1973) written by A. Zambelli and others. However, absorption peaks obtained by the $^{13}$C-spectrum are attributed to the description of Macromolecules, 8, 687 (1975).

It is preferable for a melt flow rate of the component A at a temperature of 230° C. and at a load of 2.16 kgf to be 5 g/10 min or more, is more preferable to be 20 g/10 min to 300 g/10 min, from the viewpoint of moldability of the resin composition.

In the present specification, the melt flow rate refers to a value measured in accordance with JIS K 7210. In addition, the melt flow rate may be hereinafter referred to as MFR.

The method for obtaining the propylene resin composition that satisfies the above described expression (1) is not particularly limited; but for instance, such a method is considered as to adjust a blending ratio of the propylene-based polymer (A) and the ethylene-α-olefin copolymer (B), the kind of the propylene-based polymer (A), and the mass ratio of the monomer unit derived from the propylene to the total mass of the propylene-based polymer (A) and the ethylene-α-olefin copolymer (B). It is preferable that the propylene resin composition according to the present embodiment contains both of the propylene homopolymer and the heterophasic propylene polymer material as the propylene-based polymer (A), from the viewpoint that the propylene resin composition satisfying the above described expression (1) is easily obtained. As for the propylene resin composition according to the present embodiment, when the content of the ethylene-α-olefin copolymer (B) contained in the propylene resin composition is determined to be 100% by mass, the content of the polymer (II) in the heterophasic propylene polymer material may be more than 0 and 50% by mass or less, may be 5 to 40% by mass, or may be 10 to 25% by mass, from the viewpoint that the propylene resin composition satisfying the above described expression (1) is easily obtained. It is preferable that the content of the heterophasic propylene polymer material contained in the propylene resin composition according to the present embodiment is determined in such a way as to satisfy the above described range.

[Ethylene-α-Olefin Copolymer (B)]

In the component B, when the total mass of the component B is determined to be 100% by mass, the total of the contents of the monomer units may be 100% by mass, which are derived from ethylene contained in the component B, and derived from an α-olefin having 4 or more carbon atoms contained therein, respectively.

Examples of the α-olefins having 4 or more carbon atoms include α-olefins having 4 to 12 carbon atoms. Examples of the α-olefins having 4 to 12 carbon atoms include 1-butene, 1-pentene, 1-hexene, 4-methyl-1-pentene, 1-octene and 1-decene. Among the α-olefins, the 1-butene, the 1-hexene and the 1-octene are preferable. The above described α-olefins may be α-olefins having a cyclic structure such as vinyl cyclopropane and vinyl cyclobutane.

Examples of the component B include an ethylene-1-butene copolymer, an ethylene-1-hexene copolymer, an ethylene-1-octene copolymer, an ethylene-1-decene copolymer, an ethylene-(3-methyl-1-butene) copolymer, and a copolymer of ethylene and an α-olefin having the cyclic structure.

In the component B, it is preferable for a content of a monomer unit derived from the α-olefins having 4 or more carbon atoms to be 1 to 49% by mass, is more preferable to be 5 to 49% by mass, and is further preferable to be 24 to 49% by mass, based on the total mass of the component B.

It is preferable for a melt flow rate of the component B at a temperature of 230° C. and a load of 2.16 kgf to be 0.1 g/10 min to 80 g/10 min.

It is preferable for a density of the component B to be 0.850 to 0.890 g/cm$^3$, is more preferable to be 0.850 to 0.880 g/cm$^3$, and is further preferable to be 0.855 to 0.870 g/cm$^3$, from the viewpoint of an impact resistance of the molded article.

The component B can be produced by polymerization of ethylene and an α-olefin having 4 or more carbon atoms with the use of a polymerization catalyst.

Examples of the polymerization catalysts include homogeneous catalysts represented by a metallocene catalyst, and Ziegler-Natta type catalysts.

Examples of the homogeneous catalysts include: a catalyst that consists of a chemical compound of a transition metal in Group 4 of the periodic table having a cyclopentadienyl ring, and of an alkylaluminoxane; a catalyst that consists of a chemical compound of a transition metal in Group 4 of the periodic table having a cyclopentadienyl ring, a chemical compound which reacts with the transition metal compound to form an ionic complex, and an organoaluminum compound; and a catalyst in which a catalytic component (a chemical compound of a transition metal in Group 4 of the periodic table having a cyclopentadienyl ring, a chemical compound which forms an ionic complex, an organoaluminum compound and the like) is carried on an inorganic particle (silica, clay minerals or the like), and is denatured.

Examples of the Ziegler-Natta type catalysts include a catalyst obtained by combining a titanium-containing solid transition metal component with an organometallic component.

A commercialized product may be used for the component B. Examples of the commercially available component B include: ENGAGE (registered trademark) made by Dow Chemical Japan Ltd.; TAFMER (registered trademark) made by Mitsui Chemicals, Inc.; NEO-ZEX (registered trademark) and ULTZEX (registered trademark) made by Prime Polymer Co., Ltd.; and EXCELLEN FX (registered trademark), SUMIKATHENE (registered trademark) and ESPRENE SPO (registered trademark) made by Sumitomo Chemical Company, Limited.

[Filler (C)]

Examples of the component C include an inorganic filler and an organic filler. The propylene resin composition of the present embodiment may contain only one component C, or may contain two or more components.

Examples of the inorganic fillers include glass, silicate mineral, alumina, silica, silicon dioxide, titanium oxide, iron oxide, aluminum oxide, magnesium oxide, antimony oxide, barium ferrite, strontium ferrite, beryllium oxide, magnesium hydroxide, aluminum hydroxide, basic magnesium carbonate, calcium carbonate, magnesium carbonate, carbonate mineral, calcium sulfate, magnesium sulfate, basic magnesium sulfate, calcium sulfite, carbon black and cadmium sulfide.

Examples of the organic fillers include polyesters, aromatic polyamides, cellulose and vinylon.

A shape of the filler may be a plate shape, a needle shape, or a fibrous shape.

It is preferable for the component C to be an inorganic filler, and is more preferable to be talc which is a plate-like silicate mineral, from the viewpoints of the rigidity, impact resistance and dimensional stability of the molded article.

It is preferable for an average particle diameter D50[L] of the component C to be 20.0 μm or less, and is more preferable to be 15.0 μm or less, from the viewpoints of the rigidity, impact resistance and dimensional stability of the molded article. The average particle diameter D50[L] of the component C may be 2.0 μm or more, may be 4.0 μm or more. It is preferable for the average particle diameter D50[L] of the component C to be 2.0 to 20.0 μm, is more preferable to be 4.0 to 15.0 μm.

It is preferable for the average particle diameter D50[S] of the component C to be 5.0 μm or less, and is more preferable to be 3.0 μm or less, from the viewpoints of the rigidity, impact resistance and dimensional stability of the molded article. The average particle diameter D50[S] of the component C may be 0.5 μm or more, or may be 1.0 μm or more. It is preferable for the average particle diameter D50[S] of the component C to be 0.5 to 5.0 μm, and is more preferable to be 1.0 to 3.0 in.

D50[L]/D50[S] which is a ratio of the average particle diameter D50[L] of the component C to the average particle diameter D50[S] thereof may be 1.5 or more, or may be 2.5 or more, from the viewpoints of the rigidity and dimensional stability of the molded article. D50[L]/D50[S] may be 10 or less, or may be 8 or less. D50[L]/D50[S] may be 1.5 to 10, or may be 2.5 to 8.

Here, in the present specification, the "average particle diameter D50[L]" is determined on the basis of volume-based particle size distribution measurement data which has been measured by a laser diffraction method according to the method specified in JIS R 1629, and means a particle diameter (50% equivalent particle diameter) where the number of particles accumulated from the side of smaller particle diameter has reached 50% in the particle diameter distribution measurement data. The particle diameter defined in the above way is generally referred to as "50% equivalent particle diameter", and is represented by "D50".

In the present specification, the "average particle diameter D50[S]" is determined on the basis of volume-based particle size distribution measurement data that has been measured by a centrifugal sedimentation method according to the method specified in JIS R 1619, which means a particle diameter (50% equivalent particle diameter) where the number of particles accumulated from the side of smaller particle diameter has reached 50% in the particle diameter distribution measurement data.

In the propylene resin composition of the present embodiment, the content of the component A may be, for instance, 20 to 70 parts by mass, may be 25 to 55 parts by mass, or may be 35 to 55 parts by mass, with respect to 100 parts by mass in total of the component A, the component B and the component C, from the viewpoint of the dimensional stability of the molded article.

In the propylene resin composition of the present embodiment, the content of the component B may be, for instance, 10 to 40 parts by mass or 15 to 25 parts by mass with respect to 100 parts by mass in total of the component A, the component B and the component C, from the viewpoint of the dimensional stability of the molded article.

In the propylene resin composition of the present embodiment, the content of the component C may be, for instance, 10 to 40 parts by mass, may be 15 to 35 parts by mass, or may be 20 to 35 parts by mass, with respect to 100 parts by mass in total of the component A, the component B and the component C, from the viewpoint of the dimensional stability of the molded article.

In the propylene resin composition of the present embodiment, the content of the component A may be, for instance, 20 to 80% by mass, may be 40 to 75% by mass, or may be 40 to 60% by mass, based on the total mass of the propylene resin composition, from the viewpoint of the dimensional stability of the molded article.

In the propylene resin composition of the present embodiment, the content of the component B may be 10 to 40% by mass, or 15 to 25% by mass, based on the total mass of the propylene resin composition.

In the propylene resin composition of the present embodiment, the content of the component C may be, for instance, 10 to 40% by mass, may be 15 to 35% by mass, or may be 20 to 35% by mass, based on the total mass of the propylene resin composition, from the viewpoint of the dimensional stability of the molded article.

In the propylene resin composition of the present embodiment, it is preferable that the content of the component A is 20 to 70% by mass, the content of the component B is 10 to 40% by mass, and the content of the component C is 10 to 40% by mass, each based on the total mass of the propylene resin composition, from the viewpoint of the dimensional stability of the molded article.

In the propylene resin composition of the present embodiment, it is preferable that the total content of the content of the component A, the content of the component B and the content of the component C is 90% by mass or more, based on the total mass of the propylene resin composition.

It is preferable for a melt flow rate of the propylene resin composition of the present embodiment at a temperature of 230° C. and a load of 2.16 kgf to be 15 g/10 min or more, from the viewpoint of the moldability of the resin composition.

The propylene resin composition of the present embodiment can be obtained by melt-kneading each component of the raw material. The temperature at the time of melt-kneading may be 180° C. or higher, 180 to 300° C., or 180 to 250° C.

For melt-kneading, a Banbury mixer, a single screw extruder, a twin-screw co-rotating extruder and the like can be used.

The order of kneading each of the components of the raw materials is not limited in particular. For instance, it is acceptable to collectively knead the component A, the component B and the component C, or to knead a part of the components of the component A, the component B and the component C and then knead the obtained kneaded article and the other components.

There is no particular restriction on a shape of the propylene resin composition, but the propylene resin composition may be, for instance, in a form of a strand, a sheet, a flat plate and a pellet. The pellet-like resin composition can be produced, for instance, by forming a strand-like resin composition and cutting it into an appropriate length.

It is preferable for the shape of the resin composition which is before being molded into a molded article is in the form of a pellet having a length of approximately 1 to 50 mm, from the viewpoint of the moldability of the resin composition and the production stability in the case in which the molded article is produced.

The propylene resin composition of the present embodiment may contain components other than the above described components. Examples of such components include neutralizing agents, antioxidants, ultraviolet absorbers, nucleating agents, lubricants, antistatic agents, antiblocking agents, processing aids, organic peroxides, colorants (inorganic pigments, organic pigments and pigment dispersants), foaming agents, foam nucleating agents, plasticizers, flame retardants, crosslinking agents, crosslinking aids, brightening agents, antibacterial agents and light diffusing agents. The propylene resin composition of the present embodiment may contain only one kind of these components, or may contain two or more kinds of these components.

The propylene resin composition of the present embodiment can be used as a material for forming a molded article by being molded. It is preferable for the propylene resin composition of the present embodiment to be used as a material to be injection molded. One example of an injection molded article will be described below which is produced by using the propylene resin composition of the present embodiment as the material to be injection molded.

[Injection Molded Article]

The injection molded article of the present embodiment consists of the propylene resin composition of the present embodiment. Such an injection molded article is excellent in the dimensional stability.

The above injection molded article can be produced by an injection molding method. Examples of the injection molding method include a general injection molding method, an injection foam molding method, a supercritical injection foam molding method, an ultrahigh-speed injection molding method, an injection compression molding method, a gas assisted injection molding method, a sandwich molding method, a sandwich foam molding method, and insert/outsert molding methods. The shape of the injection molded article is not limited in particular.

The injection molded article according to the present embodiment can be preferably used, for instance, in applications for automotive materials, applications for household electrical appliance, and applications for containers, and is suitable for the application for the automotive interior/exterior, among the applications. Examples of the automotive interior/exterior parts include a door trim, a pillar, an instrument panel and a bumper.

[Molded Article]

The molded article of the present embodiment may be a molded article comprising the propylene-based polymer (A), the ethylene-α-olefin copolymer (B) and the filler (C), wherein parameters W, X and Y to be defined below satisfy the following expression (1). Such a molded article is excellent in the dimensional stability.

$$1.46 \leq ((Y/X)/W) \times 100 \quad (1)$$

In the expression,

W represents the total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents the total content (% by mass) of the xylene-soluble component in the propylene-based polymer (A) and the ethylene-α-olefin copolymer (B), based on the total mass of the propylene-based polymer (A) and the ethylene-α-olefin copolymer (B), and Y represents the amount (% by mass) of a long-duration relaxation component measured by pulse NMR, in the molded article.

The molded article of the present embodiment can be easily produced, for instance, with the use of the propylene resin composition of the present embodiment.

EXAMPLES

The present invention will be described more specifically with reference to examples. However, the present invention is not limited to these examples.

In the Examples and Comparative Examples, the following raw materials were used.

[Component A: Propylene-Based Polymer]

The following propylene-based polymers ((A-1) to (A-8)) were prepared as the component A.

(A-1) Propylene Homopolymer

MFR (measured at temperature of 230° C. and load of 2.16 kgf): 62 g/10 min

Intrinsic-viscosity number (η): 1.11 dL/g

Isotactic pentad fraction: 0.9768

Mw/Mn: 8.8

Amount of component CXIS: 98% by mass

Amount of component CXS: 2% by mass (A-2) Propylene Homopolymer

The propylene homopolymer was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 107 g/10 min

Intrinsic-viscosity number (η): 0.92 dL/g

Isotactic pentad fraction: 0.9811

Mw/Mn: 5.4

Amount of component CXIS: 99.4% by mass

Amount of component CXS: 0.6% by mass (A-3) Propylene Homopolymer

The propylene homopolymer was produced by an operation of changing the hydrogen concentration between two gas phase polymerization vessels in the gas phase polymerization method, in the presence of the polymerization catalyst which was obtained according to the method described in Example 1 of Japanese Unexamined Patent Publication No. 2004-182981.

MFR (measured at temperature of 230° C. and load of 2.16 kgf): 80 g/10 min

Intrinsic-viscosity number (η): 1.13 dL/g

Isotactic pentad fraction: 0.9760

Mw/Mn: 10

Amount of component CXIS: 99.5% by mass

Amount of component CXS: 0.5% by mass (A-4) (propylene)-(propylene-ethylene) Polymer Material MFR (measured at temperature of 230° C. and load of 2.16 kgf): 38 g/10 min Intrinsic-viscosity number: ([η]CXIS) 1.03 dL/g, and ([η]CXS) 2.07 dL/g Isotactic pentad fraction: 0.9776

Ethylene content in propylene-ethylene random copolymer component: 45.5% by mass Amount of component CXIS: 69.5% by mass Amount of component CXS: 30.5% by mass Mw/Mn of component CXIS: 5.4

(A-5) (propylene)-(propylene-ethylene) Polymer Material

The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 51 g/10 min

Intrinsic-viscosity number: ([η]CXIS) 0.97 dL/g, and ([η]CXS) 2.44 dL/g

Isotactic pentad fraction: 0.9785

Ethylene content in propylene-ethylene random copolymer component: 31.3% by mass Amount of component CXIS: 74.1% by mass Amount of component CXS: 25.9% by mass Mw/Mn of component CXIS: 5.1

(A-6) (propylene)-(propylene-ethylene) Polymer Material

The (propylene)-(propylene-ethylene) polymer material was produced by a gas phase polymerization method in the presence of a polymerization catalyst which was obtained according to the method described in Example 1 of Japanese Unexamined Patent Publication No. 2004-182981.

MFR (measured at temperature of 230° C. and load of 2.16 kgf): 20 g/10 min

Intrinsic-viscosity number: ([η]CXIS) 1.14 dL/g, and ([η]CXS) 2.76 dL/g

Isotactic pentad fraction: 0.9853

Ethylene content in propylene-ethylene random copolymer component: 52.9% by mass Amount of component CXIS: 74.3% by mass Amount of component CXS: 25.7% by mass Mw/Mn of component CXIS: 6.1

(A-7) (propylene)-(propylene-ethylene) Polymer Material

The (propylene)-(propylene-ethylene) polymer material was produced in a similar method to that for the above described A-5, except that a plurality of polymerization reaction vessels are used for the polymerization of a propylene homopolymer component, in which a hydrogen concentration, a polymerization temperature and an ethylene/propylene concentration are adjusted at the time of the polymerization.

MFR (measured at temperature of 230° C. and load of 2.16 kgf): 25 g/10 min
Intrinsic-viscosity number: ([η]CXIS) 1.32 dL/g, and ([η]CXS): 2.31 dL/g
Isotactic pentad fraction: 0.9755
Amount of component CXIS: 77.4% by mass
Mw/Mn of component CXIS: 9.5
Amount of component CXS: 22.6% by mass
Ethylene content in propylene-ethylene random copolymer component: 49.1% by mass (A-8) (propylene)-(propylene-ethylene) Polymer Material The (propylene)-(propylene-ethylene) polymer material was produced in a similar method to that for the above described A-5, except that a plurality of polymerization reaction vessels are used for the polymerization of a propylene homopolymer component, in which a hydrogen concentration, a polymerization temperature and an ethylene/propylene concentration are adjusted at the time of the polymerization.

MFR (measured at temperature of 230° C. and load of 2.16 kgf): 29 g/10 min
Intrinsic-viscosity number: ([η]CXIS) 1.20 dL/g, and ([η]CXS): 3.06 dL/g
Isotactic pentad fraction: 0.9849
Amount of component CXIS: 82.7% by mass
Mw/Mn of component CXIS: 6.2
Amount of component CXS: 17.3% by mass
Ethylene content in propylene-ethylene random copolymer component: 51.4% by mass Here, in the (A-4) to (A-8), the ethylene content in the propylene-ethylene random copolymer component refers to an ethylene content in the polymer (II) (content of a monomer unit derived from ethylene, based on total mass of polymer (II)).

[Component B: Ethylene-α-Olefin Copolymer]

The following ethylene-α-olefin copolymers (B-1) and (B-2) were prepared as the component B. Incidentally, the MFR was measured according to the above described method.

(B-1) ethylene-1-butene Copolymer
  "ENR 7467" made by The Dow Chemical Company
  Density: 0.862 g/cm³
  MFR (measured at temperature of 230° C. and load of 2.16 kgf): 2.5 g/10 min
  Amount of component CXIS: 0% by mass
  Amount of component CXS: 100% by mass
(B-2) ethylene-1-octene Copolymer
  "EG 8842" made by The Dow Chemical Company
  Density: 0.857 g/cm³
  MFR (measured at temperature of 230° C. and load of 2.16 kgf): 2.7 g/10 min
  Amount of component CXIS: 0% by mass
  Amount of component CXS: 100% by mass In the component A and the component B, the MFR, the intrinsic-viscosity number and the isotactic pentad fraction were measured according to the above described methods. In addition, the contents of the component CXIS and the component CXS in each component, the ethylene content and the molecular weight distribution in the polymer (II) were calculated according to the following method.

(Contents of Component CXIS and Component CXS)

A material (component A or component B) in an amount of 2 g was weighed (hereinafter, the mass will be referred to as "p"), and was heated and dissolved in boiling xylene for 2 hours. Then, the resultant liquid was cooled to 20° C., and filtered with the use of filter paper. The filtered filtrate was concentrated under reduced pressure by a rotary evaporator, and the component CXS was obtained. The obtained component CXS was weighed ("mass of component CXS" will be referred to as "q"). The contents of the component CXIS and the component CXS in the material were calculated according to the following expressions, with the use of the numerical values a and b. In addition, the solid matter remaining on the filter paper was dried in a vacuum, and the component CXIS was obtained. The obtained component CXIS was used for the evaluation of molecular weight distribution, as needed.

amount of component $CXS$ (% by mass)=$(q/p) \times 100$ amount of component $CXIS$ (% by mass)=100− amount of component $CXS$ (% by mass)

(Ethylene Content in Polymer (II))

The ethylene content in the polymer (II) was determined on the basis of the report by Kakugo and others (Macromolecules, 15, 1150-1152 (1982)), from the $^{13}$C-NMR spectrum which was measured under the following conditions. The $^{13}$C-NMR spectrum was measured under the following conditions with the use of a sample in which approximately 200 mg of the heterophasic propylene polymer material was uniformly dissolved in 3 mL of orthodichlorobenzene in a test tube of 10 mmφ.

Measurement temperature: 135° C.
Pulse repetition time period: 10 seconds
Pulse width: 45°
Number of integration times: 2500 times (Molecular Weight Distribution)

The molecular weight distribution of the propylene homopolymer was determined by operations of measuring the weight average molecular weight (Mw(A)) and the number average molecular weight (Mn(A)) of the propylene homopolymer by GPC, and calculating a ratio (Mw/Mn) of Mw to Mn. The molecular weight distribution of the component CXIS was determined by the operations of measuring the weight average molecular weight (Mw (A)) and the number average molecular weight (Mn(A)) of the component CXIS which was obtained by the above described operations, by GPC, and calculating the ratio (Mw/Mn) of Mw to Mn. Incidentally, measurement conditions of the GPC are as described above.

[Component C: Filler]

The following filler ((C-1)) was prepared as the component C.
(C-1) Talc
  "HARW 92" made by Imerys
  Average particle diameter D50[L] (laser diffraction method and 50% equivalent particle diameter): 11.4 μm
  Average particle diameter D50[S] (centrifugal sedimentation method and 50% equivalent particle diameter): 2.54 μm Here, the average particle diameter D50[L] of the talc was measured with the use of Microtrac Particle Size Analyzer MT-3300EXII made by Nikkiso Co., Ltd. according to the method specified in JIS R 1629, after the particles were dispersed under the following condition.

(Particles Dispersing Treatment)
  Dispersion medium: Ethanol
  Apparatus: Homogenizer
  Output power: 40 W
  Treating time: 10 minutes In addition, the D50[S] was measured with the use of a centrifugal sedimentation type particle size distribution analyzer SA-CP3 made by Shimadzu Corporation according to the method specified in JIS R 1619, after the particles were dispersed under the following condition.

(Particles Dispersing Treatment)
  Dispersion medium: Ethanol
  Apparatus: W-113MkII made by Honda Electronics Co., Ltd.
  Output power: 110 W 24 kHz
  Treating time: 10 minutes Examples 1 to 6 and Comparative Examples 1 to 3

[Production of Propylene Resin Composition]

The propylene-based polymers (A-1), (A-2), (A-3), (A-4), (A-5), (A-6), (A-7) and (A-8), the ethylene-α-olefin copolymers (B-1) and (B-2) and the filler (C-1) were prepared in amounts shown in Table 1 and Table 2.

The respectively prepared components were uniformly premixed with a Henschel mixer or a tumbler, and then were kneaded and extruded with the use of a twin-screw kneading extruder (TEX 44α-II 498W-3V type made by Japan Steel Works, Ltd.) at an extrusion amount of 70 kg/hr and a screw speed of 300 rpm, under vent suction, and resin compositions were produced. Physical properties of the obtained compositions are shown in the following Table 1 and Table 2.

[Calculation of Total Content W (% by Mass) of Component CXIS and Total Content X (% by Mass) of Component CXS in Component A and Component B]

The above described W and X were calculated from: the amount (% by mass) of the component CXIS in the component A (hereinafter referred to as "W(A)"); the amount (% by mass) of the component CXS in the component A (hereinafter referred to as "X(A)"); the amount (% by mass) of the component CXIS in the component B (hereinafter referred to as "W(B)"); the amount (% by mass) of the component CXS in the component B (hereinafter referred to as "X(B)"); the content A (% by mass) of the component A and the content B (% by mass) of the component B based on the total mass of the component A and the component B; and the following expressions (3) and (4).

$$X = (X(A) \times A + X(B) \times B)/(A+B) \quad (3)$$

$$W = (W(A) \times A + W(B) \times B)/(A+B) \quad (4)$$

[Production of Injection Molded Article]

The obtained resin compositions were injection molded under the following conditions, and injection molded articles for evaluation shown in FIG. 1 were produced.

Injection molding machine: SE180D made by Sumitomo Heavy Industries, Ltd. (fastening force of 180 tons and cylinder diameter of 50 mm)
Shape of mold cavity: 100 mm (width)×400 mm (length)×3 mm (thickness)
Gate: one fan gate located at center of side face of 100 mm
Cylinder temperature: 220° C.
Mold temperature: 50° C.
Injection speed: 23 mm/sec
Cooling time period: 30 seconds FIG. 1 is a schematic view of an injection molded article for evaluation. The injection molded article 10 shown in FIG. 1 is provided with a first resin portion 1 corresponding to a mold cavity shape, and a second resin portion 2 corresponding to the gate shape. The first resin portion 1 is a film-like resin portion of which the width $L_1$ is 100 mm, the length $L_2$ is 400 mm, and the thickness (not shown) is 3 mm. In addition, in the injection molded articles formed in the present Examples and Comparative Examples, the lengths $L_3$, $L_4$ and $L_5$, and the thickness (not shown) of each side of the second resin portion 2 were 15 mm, 5 mm, 4 mm, and 2 mm, respectively. Here, the main body portion of the injection molded article is the first resin portion 1 (where, hereinafter, portion corresponding to "first resin portion 1" is referred to also as "injection molded article").

(Evaluation of Dimensional Stability)

The dimensional stability was evaluated by an operation of measuring the coefficients of linear expansion by using the obtained injection molded articles. The coefficient of linear expansion was measured with the use of a thermomechanical analyzer TMA/SS 6100 made by SII Nanotechnology Co., according to the following method.

A test piece of 5×10×3 (mm) was cut out from the center portion in the longitudinal direction of the injection molded article. The test piece was set in the above described apparatus, and the temperature was raised from −20° C. to 130° C. at a rate of temperature rise of 5° C./min, and the residual strain at the time of molding was removed. After that, the test piece was set in the apparatus again so that the change in a dimension of an MD direction (direction of resin flow) at the time of the injection molding or a TD direction (direction orthogonal to MD direction) could be measured, and the dimension at 23° C. was accurately measured. The temperature was raised from −20° C. to 80° C. at a rate of temperature rise of 5° C./min, and the changes in the dimensions in the MD direction and the TD direction during the temperature rise were measured. The change in the dimension per unit length and unit temperature was determined as the coefficient of linear expansion. In addition, the value obtained by dividing the sum of the coefficient of linear expansion in the MD direction and the coefficient of linear expansion in the TD direction by 2 was defined as "coefficient of MDTD average linear expansion" (unit: 1/° C.). The smaller the value of the coefficient of linear expansion is, the better the dimensional stability is.

[Measurement of Content Y (% by Mass) of Long-duration Relaxation Component in Molded Article]

The content Y of the long-duration relaxation component was measured in the following way with the use of pulse NMR (minispecmq 20) made by Bruker Co., Ltd. In the similar way to that in the evaluation of the dimensional stability, a test piece was cut out from an injection molded article, the test piece was then set in a sample pipe (with outer diameter of 10 mm) made from glass, and a relaxation curve was measured with the use of a solid echo method under conditions that a measurement temperature was 23° C., a number of integration times was 64 times, and a 90° pulse width was 4.10 µs. The relaxation curve obtained by measurement under the above described conditions was separated into three components having different relaxation time periods from each other, the component having the longest relaxation time period was determined to be the long-duration relaxation component, and the content (% by mass) of the long-duration relaxation component with respect to the total mass of the molded article was calculated.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| A-1 (part by mass) | 37.5 | 35.5 | — | — | — | — | — | — |
| A-2 (part by mass) | — | — | — | 30.5 | — | 35.5 | 40 | 48 |
| A-3 (part by mass) | — | — | 30.5 | — | 40 | — | — | — |
| A-4 (part by mass) | — | 15 | — | — | 13 | — | — | — |
| A-5 (part by mass) | — | — | — | — | — | 15 | 13 | 10.5 |
| A-6 (part by mass) | 13 | — | — | — | — | — | — | — |
| A-7 (part by mass) | — | — | 20 | 20 | — | — | — | — |
| B-1 (part by mass) | 12 | 12 | 12 | 12 | 10.5 | 12 | 10.5 | 8 |
| B-2 (part by mass) | 12.5 | 12.5 | 12.5 | 12.5 | 11.5 | 12.5 | 11.5 | 8.5 |
| C-1 (part by mass) | 25 | 25 | 25 | 25 | 25 | 25 | 25 | 25 |
| Content of component CXIS in component A and component B (W (% by mass)) | 61.9 | 60.3 | 60.2 | 60.2 | 65.1 | 61.9 | 66.2 | 74.2 |
| Content of component CXS in component A and component B (X (% by mass)) | 38.1 | 39.7 | 39.8 | 39.8 | 34.9 | 38.1 | 33.8 | 25.8 |
| Content of long-duration relaxation component in molded article (Y (% by mass)) | 36.6 | 35.1 | 38.7 | 37.1 | 35.3 | 34.1 | 32.2 | 26.1 |
| ((Y/X)/W) × 100 | 1.55 | 1.47 | 1.62 | 1.55 | 1.56 | 1.45 | 1.44 | 1.37 |
| Coefficient of MD linear expansion ($10^{-5}$/° C.) | 3.53 | 3.71 | 3.53 | 3.66 | 4.08 | 4.24 | 4.67 | 5.39 |
| Coefficient of TD linear expansion ($10^{-5}$/° C.) | 4.45 | 4.49 | 3.97 | 4.32 | 4.62 | 5.45 | 5.43 | 6.34 |
| Coefficient of MDTD average linear expansion ($10^{-5}$/° C.) | 3.99 | 4.09 | 3.75 | 3.99 | 4.35 | 4.84 | 5.05 | 5.87 |

TABLE 2

|  | Example 6 |
|---|---|
| A-3 (part by mass) | 26 |
| A-8 (part by mass) | 24.5 |
| B-1 (part by mass) | 12 |
| B-2 (part by mass) | 12.5 |
| C-1 (part by mass) | 25 |
| Content of component CXIS in component A and component B (W (% by mass)) | 61.5 |
| Content of component CXS in component A and component B (X (% by mass)) | 38.5 |
| Content of long-duration relaxation component in molded article (Y (% by mass)) | 37.1 |
| ((Y/X)/W) × 100 | 1.57 |
| Coefficient of MD linear expansion ($10^{-5}$/° C.) | 3.68 |
| Coefficient of TD linear expansion ($10^{-5}$/° C.) | 4.25 |
| Coefficient of MDTD average linear expansion ($10^{-5}$/° C.) | 3.97 |

It is understood from Table 1 and Table 2 that the injection molded article according to the Example has a low coefficient of MDTD average linear expansion and is excellent in the dimensional stability. In other words, it has been confirmed that according to the propylene resin composition of the present embodiment, a molded article excellent in the dimensional stability can be produced and that the injection molded article of the present embodiment is excellent in the dimensional stability.

This application claims priority from Japanese patent application No. 2017-080588 (filed on Apr. 14, 2017), the entire disclosure of which is incorporated herein by reference.

REFERENCE SIGNS LIST

1 . . . first resin portion, 2 . . . second resin portion, and 10 . . . injection molded article.

What is claimed is:

1. A propylene resin composition comprising:
a propylene-based polymer (A);
an ethylene-α-olefin copolymer (B), the ethylene-α-olefin copolymer (B) not containing a monomer unit derived from propylene; and
a filler (C), wherein
parameters W, X and Y to be defined below satisfy the following expression (1):

$$1.46 \leq ((Y/X)/W) \times 100 \tag{1}$$

wherein W represents a total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents a total content (% by mass) of a xylene-soluble component in the propylene-based polymer (A) and the ethylene-α-olefin copolymer (B), based on the total mass of the propylene-based polymer (A) and the ethylene-α-olefin copolymer (B), and Y represents an amount (% by mass) of a long-duration relaxation component measured by pulse NMR, in a molded article obtained by injection molding the propylene resin composition into a mold cavity of 100 mm (width)×400 mm (length)×3 mm (thickness) under conditions of a cylinder temperature of 220° C., a mold temperature of 50° C. and an injection speed of 23 mm/sec;

wherein the propylene-based polymer (A) contains a heterophasic propylene polymer material comprising a polymer (II) containing monomer units derived from propylene and a monomer unit derived from at least one α-olefin selected from the group consisting of ethylene and α-olefins having 4 or more and 12 or less carbon atoms dispersed in a matrix of a polymer (I) containing 80% by mass or more of a monomer unit derived from propylene, provided that a total mass of polymer (I) is 100% by mass, and the content of the polymer (II) in the heterophasic propylene polymer material is more than 0% by mass and no more than 50% by mass when the content of the ethylene-α-olefin copolymer (B) contained in the propylene resin composition is 100% by mass.

2. The propylene resin composition according to claim 1, wherein
 a content of the propylene-based polymer (A) is 20 to 70% by mass,
 a content of the ethylene-α-olefin copolymer (B) is 10 to 40% by mass, and
 a content of the filler (C) is 10 to 40% by mass.

3. The propylene resin composition according to claim 2, wherein a ratio of D50[L]/D50[S] is 2.5 to 10, wherein D50[L] is an average particle diameter of the filler (C) which is a 50% equivalent particle diameter measured by a laser diffraction method according to JIS R 1629, and D50[S] is an average particle diameter of the filler (C) which is a 50% equivalent particle diameter measured by a centrifugal sedimentation method according to JIS R 1619.

4. The propylene resin composition according to claim 1, wherein a ratio of D50[L]/D50[S] is 2.5 to 10, wherein D50[L] is an average particle diameter of the filler (C) which is a 50% equivalent particle diameter measured by a laser diffraction method according to JIS R 1629, and D50[S] is an average particle diameter of the filler (C) which is a 50% equivalent particle diameter measured by a centrifugal sedimentation method according to JIS R 1619.

5. An injection molded article comprising the propylene resin composition according to claim 1.

6. An injection molded article comprising the propylene resin composition according to claim 2.

7. An injection molded article comprising the propylene resin composition according to claim 3.

8. An injection molded article comprising the propylene resin composition according to claim 4.

9. A molded article comprising:
 a propylene-based polymer (A);
 an ethylene-α-olefin copolymer (B), the ethylene-α-olefin copolymer (B) not containing a monomer unit derived from propylene; and
 a filler (C), wherein
 parameters W, X and Y to be defined below satisfy the following expression (1):

$$1.46 \leq ((Y/X)/W) \times 100 \tag{1}$$

wherein W represents a total content (% by mass) of a xylene-insoluble component in the propylene-based polymer (A) and the ethylene-α-olefin copolymer (B), based on the total mass of the propylene-based polymer (A) and the ethylene-α-olefin copolymer (B), X represents a total content (% by mass) of a xylene-soluble component in the propylene-based polymer (A) and the ethylene-α-olefin copolymer (B), based on the total mass of the propylene-based polymer (A) and the ethylene-α-olefin copolymer (B), and Y represents an amount (% by mass) of a long-duration relaxation component measured by pulse NMR, in the molded article;

wherein the propylene-based polymer (A) contains a heterophasic propylene polymer material comprising a polymer (II) containing monomer units derived from propylene and a monomer unit derived from at least one α-olefin selected from the group consisting of ethylene and α-olefins having 4 or more and 12 or less carbon atoms dispersed in a matrix of a polymer (I) containing 80% by mass or more of a monomer unit derived from propylene, provided that a total mass of polymer (I) is 100% by mass, and the content of the polymer (II) in the heterophasic propylene polymer material is more than 0% by mass and no more than 50% by mass when the content of the ethylene-α-olefin copolymer (B) contained in the molded article is 100% by mass.

* * * * *